US009838951B2

(12) United States Patent
Han et al.

(10) Patent No.: US 9,838,951 B2
(45) Date of Patent: Dec. 5, 2017

(54) APPARATUSES, SYSTEMS, AND METHODS FOR MEASURING QUALITY OF CELL DISCOVERY SIGNAL

(71) Applicants: Intel Corporation, Santa Clara, CA (US); Intel IP Corporation, Santa Clara, CA (US)

(72) Inventors: Seunghee Han, Cupertino, CA (US); Alexei Davydov, Nizhny Novgorod (RU)

(73) Assignee: Intel Corporation and Intel IP Corporation, Santa Clara, CA (US)

(*) Notice: Subject to any disclaimer, the term of this patent is extended or adjusted under 35 U.S.C. 154(b) by 389 days.

(21) Appl. No.: 14/577,419

(22) Filed: Dec. 19, 2014

(65) Prior Publication Data

US 2015/0264636 A1    Sep. 17, 2015

Related U.S. Application Data

(60) Provisional application No. 61/953,641, filed on Mar. 14, 2014, provisional application No. 61/953,639, filed on Mar. 14, 2014, provisional application No. 61/968,278, filed on Mar. 20, 2014.

(51) Int. Cl.
*H04W 48/16*    (2009.01)
*H04B 17/318*   (2015.01)
*H04B 17/27*    (2015.01)
*H04B 17/382*   (2015.01)

(52) U.S. Cl.
CPC ............ *H04W 48/16* (2013.01); *H04B 17/27* (2015.01); *H04B 17/318* (2015.01); *H04B 17/382* (2015.01)

(58) Field of Classification Search
CPC ..... H04W 48/16; H04B 17/27; H04B 17/318; H04B 17/382
See application file for complete search history.

(56) References Cited

U.S. PATENT DOCUMENTS

| 2013/0040640 | A1 | 2/2013 | Chen et al. |
| 2013/0077507 | A1 | 3/2013 | Yu et al. |
| 2013/0084910 | A1 | 4/2013 | Suzuki et al. |
| 2014/0044003 | A1 | 2/2014 | Drazynski et al. |

(Continued)

FOREIGN PATENT DOCUMENTS

| EP | 2693809 A2 | 2/2014 |
| NO | 2013/112983 A2 | 8/2013 |

(Continued)

OTHER PUBLICATIONS

U.S. Appl. No. 61/933,915, filed Jan. 31, 2014.*

(Continued)

*Primary Examiner* — Melvin Marcelo
(74) *Attorney, Agent, or Firm* — Schwabe, Williamson & Wyatt, P.C.

(57) ABSTRACT

Embodiments of the present disclosure are directed towards devices and methods for discovering and waking up dormant access nodes in cellular networks. In one embodiment, the user equipment may be configured with information to assist in determining a discovery zone of discovery signals transmitted by cells in a network. In some embodiments, the information may include a duration of a discovery zone.

14 Claims, 6 Drawing Sheets

(56) References Cited

U.S. PATENT DOCUMENTS

| | | | |
|---|---|---|---|
| 2014/0286280 A1 | 9/2014 | Seo et al. | |
| 2016/0262100 A1* | 9/2016 | Larsson | H04W 48/16 |
| 2017/0013490 A1* | 1/2017 | Lunttila | H04W 24/10 |

FOREIGN PATENT DOCUMENTS

| | | |
|---|---|---|
| NO | 2014/032733 A1 | 3/2014 |
| NO | 2015/115986 A1 | 8/2015 |
| RU | 2464733 C2 | 10/2012 |
| WO | 2012170794 A1 | 12/2012 |
| WO | 2013055126 A1 | 4/2013 |
| WO | WO 2013/112983 A2 | 8/2013 |
| WO | WO2013/137811 A1 | 9/2013 |
| WO | WO 2014/010956 A1 | 1/2014 |
| WO | WO 2014/032733 A1 | 3/2014 |

OTHER PUBLICATIONS

R1-134496, 3GPP TSG RAN WG1 Meeting #74bis, NTT DOCOMO, 'Views on Small Cell On/Off with Small Cell Discovery', Oct. 7-11, 2013, 5 pages.*

R1-140038, 3GPP TSG RAN WG1 Meeting #76, Huawei, HiSilicon, 'Enhancements of RRM measurements for small cell on/off', Feb. 10-14, 2014, 4 pages.*

3GPP TR 36.872 V12.1.0 (Dec. 2013), 3rd Generation Partnership Project; Small cell enhancements for E-UTRA and E-UTRAN—Physical layer aspects (Release 12), 100 page.*

Intel Corporation, "On small cell discovery signal based RSRQ measurement," 3GPP TSG-RAN WG1 #78, R1-142851, Agenda item: 7.2.1.2.4, Aug. 18-22, 2014, Dresden, Germany, 4 pages.

TSG RAN WG1, "LS on small cell discovery signal," 3GPP TSG RAN WG1 Meeting #77, R1-142698, May 19-23, 2014, Seoul, Korea, 1 page.

TSG RAN WG1, "LS on discovery signal details," 3GPP TSG RAN WG1 Meeting #77, R1-142733, May 19-23, 2014, Seoul, Korea, 2 pages.

RAN WG1, "LS on RAN1 agreements on DRS design," 3GPP TSG RAN WG1 Meeting #77, R1-142775, May 19-23, 2014, Seoul, Korea, 2 pages.

NTT DOCOMO, "Views on Discovery Signal-based RSRQ Measurement," 3GPP TSG RAN WG1 Meeting #77, R1-142261, May 19-23, 2014, Seoul, Korea, 4 pages.

NTT DOCOMO, "Definition of RSSI in e-ICIC," 3GPP TSG-RAN WG4 meeting #58, R4-110765, Feb. 21-25, 2011, Taipei, Taiwan, 4 pages.

3GPP, "Evolved Universal Terrestrial Radio Access (E-UTRA); Physical layer; Measurements (Release 11)," 3GPP TS 36.214 V11.1.0 (Dec. 2012), Dec. 20, 2012, Lte Advanced, 14 pages.

3GPP, "Evolved Universal Terrestrial Radio Access (E-UTRA); Physical channels and modulation (Release 12)," 3GPP TS 36.211 V12.0.0 (Dec. 2013), Dec. 20, 2013, Lte Advanced, 120 pages.

3GPP, "Evolved Universal Terrestrial Radio Access (E-UTRA); Physical layer procedures (Release 12)," 3GPP TS 36.213 V12.0.0 (Dec. 2013), Dec. 20, 2013, Lte Advanced, 100 pages.

International Search Report and Written Opinion dated May 26, 2015 from International Application No. PCT/US2015/015505.

Office Action dated Sep. 9, 2016 from Taiwan Patent Application No. 104104406, 27 pages.

Office Action dated Apr. 10, 2017 from Russian Patent Application No. 2016133203, 10 pages.

Examination Report dated May 9, 2017 from Australian Patent Application No. 2015229967, 4 pages.

Examiner's Report dated Jun. 2, 2017 from Canadian Patent Application No. 2,937,805, 4 pages.

3GPP, "Technical Specification Group Radio Access Network; Evolved Universal Terrestrial Radio Access (E-UTRA); Radio Resource Control (RRC); Protocol specification (Release 12)," 3GPP TS 36.331 V12.0.0 (Dec. 2013), Jan. 10, 2014, Lte Advanced, 349 pages.

Office Action dated Aug. 9, 2017 from Taiwan Divisional Application No. 105144231, 16 pages.

Office Action dated Aug. 29, 2017 from Japanese Patent Application No. 2016-569559, 5 pages.

ZTE "Enhanced small cell on/off mechanisms," 3GPP TSG-RAN WG1 #76, R1-140285, Internet <URL:http://www.3gpp.org/ftp/tsg_ran/WG1_RL1/TSGR1_76/Docs/R1-140285.zip>; Prague, Czech Republic, Feb. 10-14, 2014, 6 pages.

Intel Corporation, "Type 1 resource allocation for D2D discovery," 3GPP TSG-RAN WG2 #85 R2-140298, Internet <URL:http://www.3gpp.org/ftp/tsg_ran/WG2_RL2/TSGR2_85/Docs/R2-140298.zip>, Prague, Czech Repulbic, Feb. 10-14, 2014, 5 pages.

Huawei, HiSilicon, "Enhancements of RRM measurements for small cell on/off," 3GPP TSG-RAN WG1 #76 R1-140038, Internet <URL:http://www.3gpp.org/ftp/tsg_ran/WG1_RL1/TSGR1_76/Docs/R1-140038.zip> Prague, Czech Repulbic, Feb. 10-14, 2014, 5 pages.

Extended European Search Report dated Oct. 2, 2017 from European Patent Application No. 15761192.2, 10 pages.

* cited by examiner

APPARATUSES, SYSTEMS, AND METHODS FOR MEASURING QUALITY OF CELL DISCOVERY SIGNAL

RELATED APPLICATIONS

This application claims the benefit of U.S. Provisional Application No. 61/953,641 filed Mar. 14, 2014 and entitled "Measurement Quality Definition for Small Cell Discovery Signal"; U.S. Provisional Application No. 61/953,639 filed Mar. 14, 2014 and entitled "Small Cell Discovery Signal"; and U.S. Provisional Application No. 61/968,278 filed Mar. 20, 2014 and entitled "Small Cell Discovery Signal." The entirety of the above-listed applications are hereby incorporated herein by reference.

FIELD

Embodiments of the present disclosure generally relate to the field of cellular networks, and more particularly, to techniques, and apparatuses employing techniques for measuring quality of cell discovery signals.

BACKGROUND

As cellular networks become more congested, network operators continue to deploy smaller cells on several orders of magnitude to meet projected demands. The presence of these smaller cells helps offload traffic from the macro cells, but may cause unwanted interference. In some situations, smaller cells may not be actively serving a user, but may continue to transmit at least the downlink common channels. This continued transmission may cause undesirable interference, especially where the density of access nodes is high. Additionally, these continued transmissions may expend energy unnecessarily. Therefore it may be beneficial to have access nodes enter a dormant state when they are not serving a user to limit interference and conserve power.

While placing the access nodes in a dormant state may prevent interference and save power, it creates new challenges for discovery and reactivation of the dormant access nodes.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
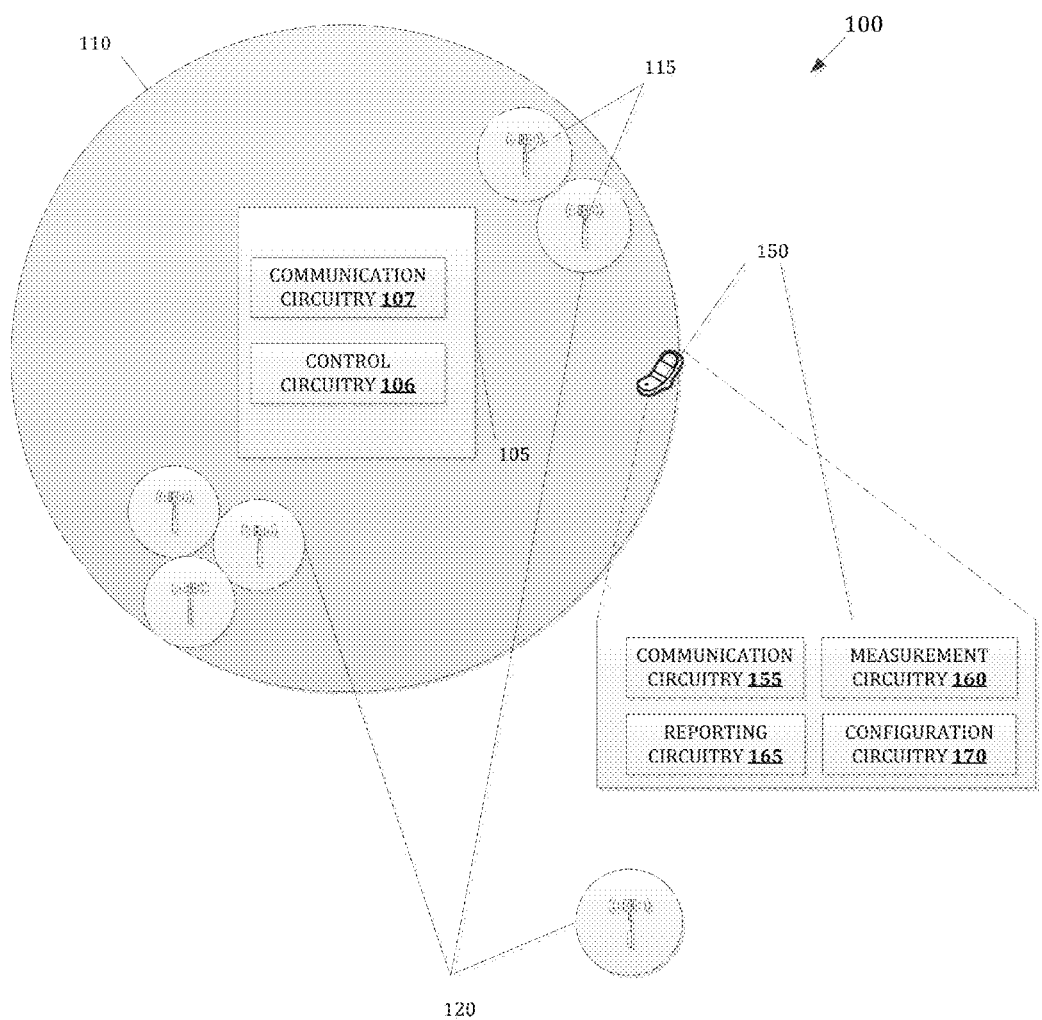
FIG. 1 schematically illustrates a network including a macro cell and a number of small cells in accordance with some embodiments.

Embodiments of the present disclosure describe methods and apparatuses for discovering and waking up dormant access nodes. These embodiments are designed to provide efficient discovery and utilization of access nodes while allowing access nodes to go dormant to conserve power and limit interference.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

The description may use the phrases "in an embodiment," "in embodiments," or "in some embodiments," which may each refer to one or more of the same or different embodiments. Furthermore, the terms "comprising," "including," "having," and the like, as used with respect to embodiments of the present disclosure, are synonymous.

For the purposes of the present disclosure, the term "or" is used as an inclusive term to mean at least one of the components coupled with the term. For example, the phrase "A or B" means (A), (B), or (A and B); and the phrase "A, B, or C" means (A), (B), (C), (A and B), (A and C), (B and C), or (A, B, and C).

As used herein, the term "circuitry" refers to, is part of, or includes hardware components such as an Application Specific Integrated Circuit (ASIC), a system-on-chip (SoC), an electronic circuit, a logic circuit, a processor (shared, dedicated, or group) or memory (shared, dedicated, or group) that are configured to provide the described functionality. In some embodiments, the circuitry may execute one or more software or firmware programs to provide at least some of the described functionality.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

FIG. 1 illustrates an exemplary wireless communication network 100, according to one embodiment. The wireless communication network 100 (hereinafter "network 100") may be an access network of a 3rd Generation Partnership Project ("3GPP") long-term evolution ("LTE") network such as evolved universal terrestrial radio access network ("EUTRAN"). The network 100 features, among other elements, a relatively high-power base station, such as an evolved Node B ("eNB") 105, that is to provide a wireless macro cell 110.

To serve a user equipment ("UE") 150 and otherwise administrate or manage wireless communication in the network 100, the eNB 105 may include control circuitry 106 and communication circuitry 107. The control circuitry 106 may perform various tasks in the network 100, including, but not limited to, providing a wireless cell that is to serve the UE 150, configuring network nodes for performing radio resource management ("RRM") measurements and signal quality reporting, and managing operation of small cells in the network 100. The communication circuitry 107 may send or receive messages associated with discovery, control, and communication processes.

In the network 100, the UE 150 is to connect with the eNB 105 when the UE is within the wireless macro cell 110. The UE 150 may be any device adapted to connect with the eNB 105 according to, for example, the 3GPP specification, such as a hand-held telephone, a laptop computer, or other similar device equipped with a mobile broadband adapter. According to some embodiments, the UE 150 may administrate one or more tasks in the network 100, including mobility management, call control, session management, cell discovery, and identity management.

To process data, communicate with the eNB 105 or the nodes 115, or otherwise function in the network 100, the UE 150 may include, but is not limited to, communication circuitry 155, measurement circuitry 160, reporting circuitry 165, and configuration circuitry 170. The communication circuitry 155 may perform a plurality of tasks for the UE 150, such as sending or receiving messages from or to other nodes of the network 100, for example, eNB 105 and access nodes 115. The communication circuitry 155 may receive, for example, configuration messages and physical signals such as, but not limited to, primary synchronization signals (PSSs), secondary synchronization signals (SSSs), cell-specific reference signals (CRSs), positioning reference signals (PRSs), channel state information reference signals (CSI-RSs), etc. The communication circuitry 155 may further transmit, for example, feedback messages to the eNB 105 or access nodes 115. The measurement circuitry 160 may perform RRM measurements. These measurements may be based at least in part on physical signals received from the access nodes 115. The reporting circuitry 160 may generate the feedback messages that provide signal quality metrics based on the RRM measurements. The signal quality metrics may, in some embodiments, be used by the eNB 105 to manage small-cell operation in the network 100.

The plurality of low-powered radio access nodes 115 included in the network 100 are to provide a plurality of small cells 120. According to the embodiment, the plurality of small cells 120 may be femtocells, picocells, microcells, or essentially any similar cell having a range of about less than two (2) kilometers ("km"). In some arrangements, small cells 120 may have a range of about less than 500 meters. In this arrangement, the UE 150 may be provided both macro-layer and local-node layer coverage. With the benefit of such coverage, the bandwidth or network reliability (e.g., near the edge of macro cell 110) may be increased for the UE 150 through data offloading, carrier aggregation, or other similar technologies. In the illustrated embodiment, the range of the macro cell 110 may be insufficient to reach each small cell 120 of the plurality and, therefore, not all of the plurality of small cells 120 may have macro-layer coverage.

Each access node 115, may contain complementary circuitry to eNB 105. For instance, each small cell may include communication and control circuitry to perform those functions discussed above. The access nodes 115 providing small cells 120 may be put into a dormant state when they are not serving a UE. When dormant, an access node does not provide a service cell. In some embodiments a dormant access node may not transmit a primary synchronization signal (PSS), a secondary synchronization signal (SSS), or a common reference signal (CRS). As discussed below, a dormant access node may be partially or periodically awake to send or receive discovery messages in order to participate in discovery and wake up processes. In some embodiments a dormant access node may be able to send or receive discovery messages associated with a D2D protocol.

Although discussed in the context of a dormant access node providing a small cell, the processes discussed herein may also be used to discover and wake up an access node (such as an eNB) providing a macro cell. In general the processes can be used to facilitate discovery and wake up of any dormant access node without regard to size of service cell.

Appropriately defined discovery signals may facilitate small cell on/off operation, which may, in turn, reduce inter-cell interferences and bring about user throughput improvements under dense small-cell deployment scenarios. For instance, access nodes 115 may transmit discovery signals in an off state so that the UE 150 may detect the discovery signals and report measurements to the eNB 105 so that a network may properly manage the small cell on/off operation for the UE 105. As used herein, an off state of an access node may indicate that the access node does not provide a cell for the servicing of UEs. Thus, an access node partially awake to send/receive discovery messages may still be considered in an off-state. Conversely, an on state may indicate that the access node provides a service cell for one or more UEs.

The discovery signals transmitted by an off-state access node may include different combinations of PSS, SSS, CRS, PRS, or CSI-RS. For example, in some embodiments the discovery signal may include PSS+SSS+CRS; PSS+CSI-RS; PSS+SSS+CRS+CSI-RS; PSS+SSS+CSI-RS; PSS+PRS; or PSS+SSS+PRS.

Discovery signal measurements that support the management of small-cell on/off operation may include, for example, discovery signal reference signal received power (DS-RSRP) and discovery signal reference signal received quality (DS-RSRQ). While principles of the DS-RSRP and DS-RSRQ (or discovery signal received signal strength indicator (DS-RSSI)) may be similar to existing CRS-based RSRP and RSRQ (or RSSI) measurements, the discovery signal may have a different structure than the CRS and, therefore, the corresponding measurements may need to be further defined. Thus, embodiments of the present disclosure describe usage of DS-RSRQ and the DS-RSSI in light of newly defined discovery signals.

Figure 2:
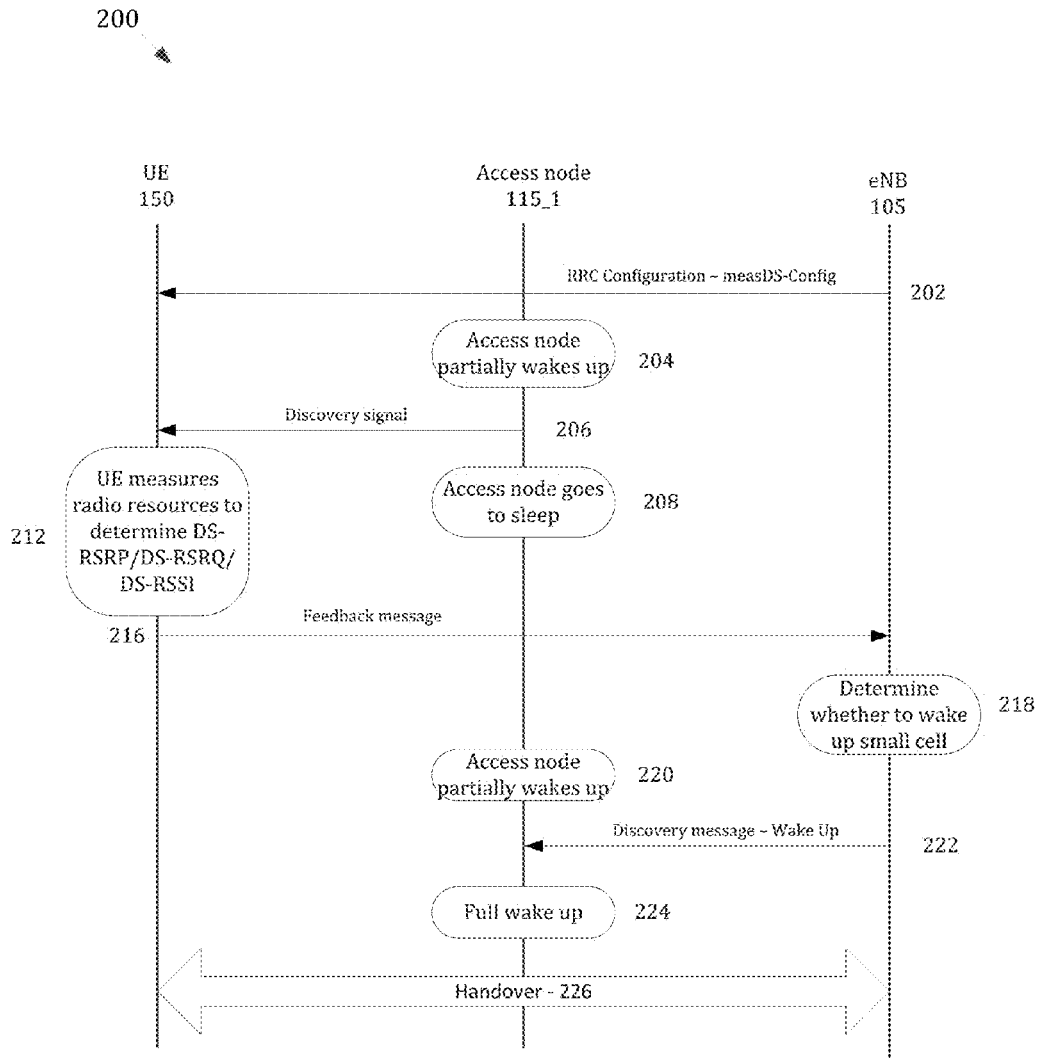
FIG. 2 schematically illustrates an access node discovery and wake up process in accordance with some embodiments.

FIG. 2 illustrates an access node discovery and wake up process 200 in accordance with some embodiments.

In the process 200, the eNB 105 may transmit one or more configuration messages to the UE 150 in a configuration process. The configuration process may be a higher-layer process, for example, a layer 3 process with reference to an EUTRAN protocol stack. The configuration process may be a radio resource control (RRC) configuration process that includes one or more RRC configuration messages. The RRC configuration messages may include a DS measurement configuration information element, MeasDS-Config IE, that includes information relevant to the measurement of discovery signals in the network 100. Of particular relevance, the DS measurement configuration IE may include a discovery signal measurement timing configuration (DMTC) and an indication of a duration of a discovery zone in which discovery signals may be transmitted by the access nodes 115.

In some embodiments, the MeasDS-Config IE, for Third Generation Partnership Project (3GPP) Release 12 (r12), may have an abstract syntax notation one (ASN1) format as follows.

Period) and offset (dmtc-Offset) for the carrier frequency. Examples of DMTC periodicity include, but are not limited to, 40 ms, 80 ms, etc. The value of the DMTC offset may be a number of subframes. One DMTC may apply to all cells in a carrier frequency. The DMTC may also be common for all carrier frequencies in some embodiments.

While DMTC and duration of the discovery zone may be common for all cells, the actual discovery zones may differ. This may be due to the actual discovery zones being based on PSS, SSS, or CRS, which may be different for each cell,

```
-- ASN1START
MeasDS-Config-r12 ::=          CHOICE {
    release                             NULL,
    setup                               SEQUENCE {
        dmtc-PeriodOffset-r12               CHOICE {
            ms40-r12                            INTEGER(0..39),
            ms80-r12                            INTEGER(0..79),
            ms160-r12                           INTEGER(0..159),
            ...
        },
        ds-OccasionDuration-r12         CHOICE {
            durationFDD-r12                 INTEGER(1..maxDS-Duration-r12),
            durationTDD-r12                 INTEGER(2..maxDS-Duration-r12)
        },
        measCSI-RS-ToRemoveList-r12     MeasCSI-RS-ToRemoveList-r12
OPTIONAL, -- Need ON
        measCSI-RS-ToAddModList-r12     MeasCSI-RS-ToAddModList-r12
OPTIONAL, -- Need ON
        ...
    }
}
MeasCSI-RS-ToRemoveList-r12 ::= SEQUENCE (SIZE (1..maxCSI-RS-Meas-r12)) OF
MeasCSI-RS-Id-r12
MeasCSI-RS-ToAddModList-r12 ::= SEQUENCE (SIZE (1..maxCSI-RS-Meas-r12)) OF
MeasCSI-RS-Config-r12
MeasCSI-RS-Id-r12 ::=    INTEGER (1..maxCSI-RS-Meas-r12)
MeasCSI-RS-Config-r12 ::=      SEQUENCE {
    measCSI-RS-Id-r12               MeasCSI-RS-Id-r12,
    physCellId-r12                  INTEGER (0..503),
    scramblingIdentity-r12          INTEGER (0..503),
    resourceConfig-r12              INTEGER (0..31),
    subframeOffset-r12              INTEGER (0..4),
    csi-RS-IndividualOffset-r12     Q-OffsetRange}
-- ASN1STOP
```

The csi-RS-IndividualOffset field of the MeasDS-Config IE may indicate a CSI-RS individual offset that is applicable to a specific CSI-RS resource. The value may be, for example, −24 dB, −22 dB, etc.

The ds-OccasionDuration field of the MeasDS-Config IE may indicate a duration of the discovery zone, which may also be referred to as "discovery signal occasion," for a given carrier frequency. The carrier frequency may be indicated by a carrierFreq field in measurement object EUTRA, MeasObjectEUTRA, IE. The duration of the discovery zone may be common for all cells transmitting discovery signals on the carrier frequency. The duration may be given as a number of time units. For example, the duration may be given as a number of subframes, orthogonal frequency division multiplexing (OFDM) symbols, etc.

The measCSI-RS-ToAddModList field of the MeasDS-Config IE may provide a list of CSI-RS resources to add or modify in a CSI-RS resource list for discovery signals measurement.

The measCSI-RS-ToRemoveList field of the MeasDS-Config IE may provide a list of CSI-RS resources to remove from the CSI-RS resource list for discovery signals measurement.

The dmtc-PeriodOffset field of the MeasDS-Config IE may indicate DMTC, which includes a periodicity (dmtc-in conjunction with the DMTC and the duration as will be described in further detail below.

The physCellId field of the MeasDS-Config IE may indicate a physical cell identity where UE may assume that the CSI-RS and the PSS/SSS/CRS corresponding to the indicated physical cell identity are quasi co-located with respect to average delay and doppler shift.

The resourceConfig field of the MeasDS-Config IE may be a CSI reference signal configuration parameter. See, for example, tables 6.10.5.2-1 and 6.10.5.2-2 of 3GPP Technical Specification (TS) 36.211 v12.0.0 (2013 Dec. 20).

The scramblingIdentity field of the MeasDS-Config IE may be a pseudo-random sequence generator parameter, $n_{ID}$. See, for example, section 7.2.5 of 3GPP TS 36.213 v12.0.0 (2013 Dec. 20).

The subframeOffset field of the MeasDS-Config IE may indicate a subframe offset between SSS and the CSI-RS resource in a discovery zone.

The process 200 may further include the access node 115_1 waking up at 204. The wake up of the access node 115_1 may include powering up at least partway in order to receive discovery messages or send discovery signals. The access node 115_1 may wake up at predetermined times, for example, periodically, for a predetermined period.

In some embodiments, the eNB 105 or the UE 150 may send a discovery message to the access node 115_1 during the predetermined wake-up periods. The discovery messages may include, in some embodiments, a request for the access node 115_1 to fully wake-up in order to provide a small cell to serve a user equipment such as UE 150.

The process 200 may further include, at 206, the sending of a discovery signal by the access node 115_1. As discussed above, the discovery signal may be various combinations of PSS, SSS, CRS, PRS, or CSI-RS transmitted in a discovery zone. After sending discovery signal, and assuming that the access node 115_1 has received no discovery message indicating that the access node 115_1 is to fully wake up, the access node 115_1 may go to sleep at 208.

Figure 3:
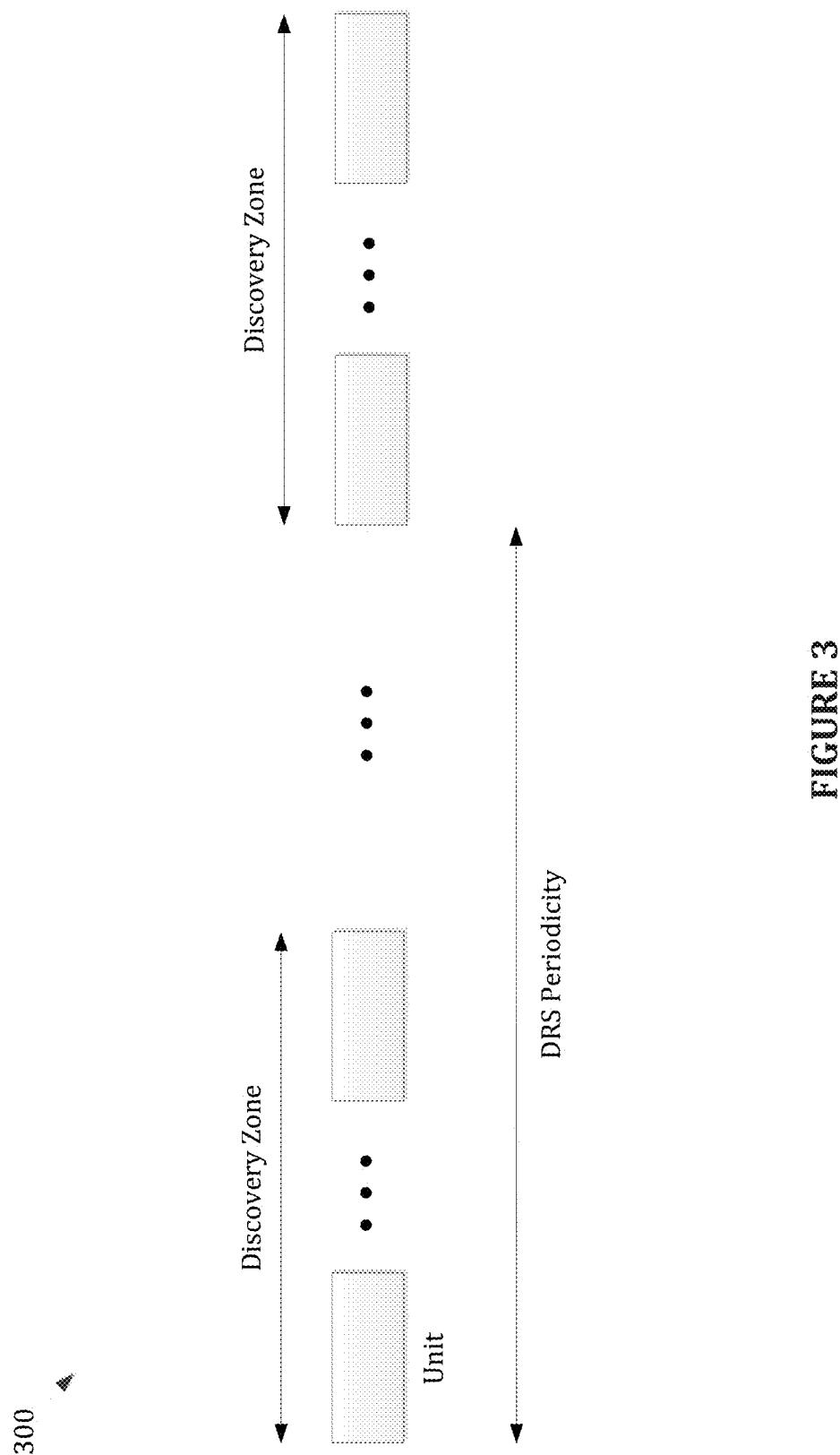
FIG. 3 schematically illustrates periodic discovery zones in accordance with some embodiments.

FIG. 3 illustrates periodic discovery zones 300 in accordance with some embodiments of the present invention. The discovery zones 300 may include a first discovery zone 300_1 and a second discovery zone 300_2. Each of the discovery zones 300 may include one or more units. In general, the discovery zone may include X units, with X being communicated in the ds-OccasionDuration field. The discovery zone may repeat with a predetermined periodicity.

In some embodiments, the discovery zone may include, for example, six OFDM symbols and the periodicity may be approximately 100 ms. Other embodiments may include other values or units.

The process 200 may further include, at 212, the UE 150 measuring radio resources to determine discovery signal quality metrics. The discovery signal quality metrics may include, for example, DS-RSRP, DS-RSRQ, or DS-RSSI. As used herein, DS-RSRP, DS-RSRQ, and DS-RSSI may be RSRP, RSRQ, and RSSI metrics, respectively, that are based on discovery signals or otherwise used in discovery procedures as described herein. Therefore, for purposes of the present description, DS-RSRP may be interchangeable with RSRP, DS-RSRQ may be interchangeable with RSRQ, and DS-RSSI may be interchangeable with RSSI.

In general, the DS-RSRP may be defined as a linear average over power contributions (in watts) of resource elements that carry CRSs within a considered measurement frequency bandwidth, for example, the discovery zone. If the UE 150 can reliably detect that CRSs are present in units, e.g., subframes, outside of the discovery zone, the UE 150 may use those units in addition to the units having the CRSs in the discovery zone to determine DS-RSRP.

In some embodiments, the DS-RSSI may be determined by measuring a linear average of total received power (in watts) over all units of the discovery zone. For example, the DS-RSSI may be measured over all OFDM symbols in the discovery zone. In some embodiments, this may include measuring all resource elements of the OFDM symbols in the discovery zone even if some of the resource elements may not be able to carry a discovery signal.

In some embodiments, the DS-RSSI may be measured on all potential resource elements that can be transmitted with discovery signal. For example, if the discovery signal comprises CSI-RS and CSI-RS is used to measure the DS-RSRP and DS-RSRQ, the DS-RSSI may be measured only on the resource elements that can be configured for CSI-RS.

In some embodiments, the reference point for the DS-RSRP and DS-RSSI may be the antenna connector of the UE 150.

Having determined the DS-RSRP and DS-RSSI, the UE 150 may proceed to determine the DS-RSRQ. In some embodiments, the DS-RSRQ may be defined as (N×DS-RSRP)/DS-RSSI, where N is a number of resource blocks of the discovery zone. In some embodiments, the DS-RSRP and DS-RSSI measurements may be made over the same set of resource blocks.

The process 200 may include, at 216, the UE 150 generating and transmitting a feedback message to the eNB 105. The feedback message may include an indication of one or more of the DS quality metrics. For example, the feedback message may include an indication of the DS-RSRQ.

The process 200 may include, at 218, the eNB 105 determining whether to wake up an access node to provide a service cell. The eNB 105 may make the determination based on the DS quality metrics received in the feedback message at 216.

If the eNB 105 determines that it is to wake up the small cell, it may wait until an access node of the target small cell wakes up for discovery signal transmission, for example, the access node 115_1 waking up at 220, and may send a discovery message to the access node at 222.

The access node 115_1 may receive the discovery message with the command to wake up and may, at 224, proceed to engage in a full wake-up procedure. Upon waking up fully the access node 115_1 may begin transmitting reference signals to facilitate the provision of a service cell. For example, the access node 115_1 may transmit reference signals such as, but not limited to, PSS, SSS, CRS, or CSI-RS.

The eNB 105, access node 115_1, and UE 150 may engage in the handover procedures at 226. In some embodiments, the handover procedures at 226 may be a full handover or partial handover. A full handover may include the UE 150 connecting with the access node 115_1 and disconnecting from the eNB 105, while a partial handover may include the UE 150 connecting with the access node 115_1 and remaining connected with the eNB 105. For example, the UE 150 may utilize the access node 115_one to provide a secondary cell (S-Cell) while maintaining a primary cell (P-Cell) with the eNB 105.

Figure 4:
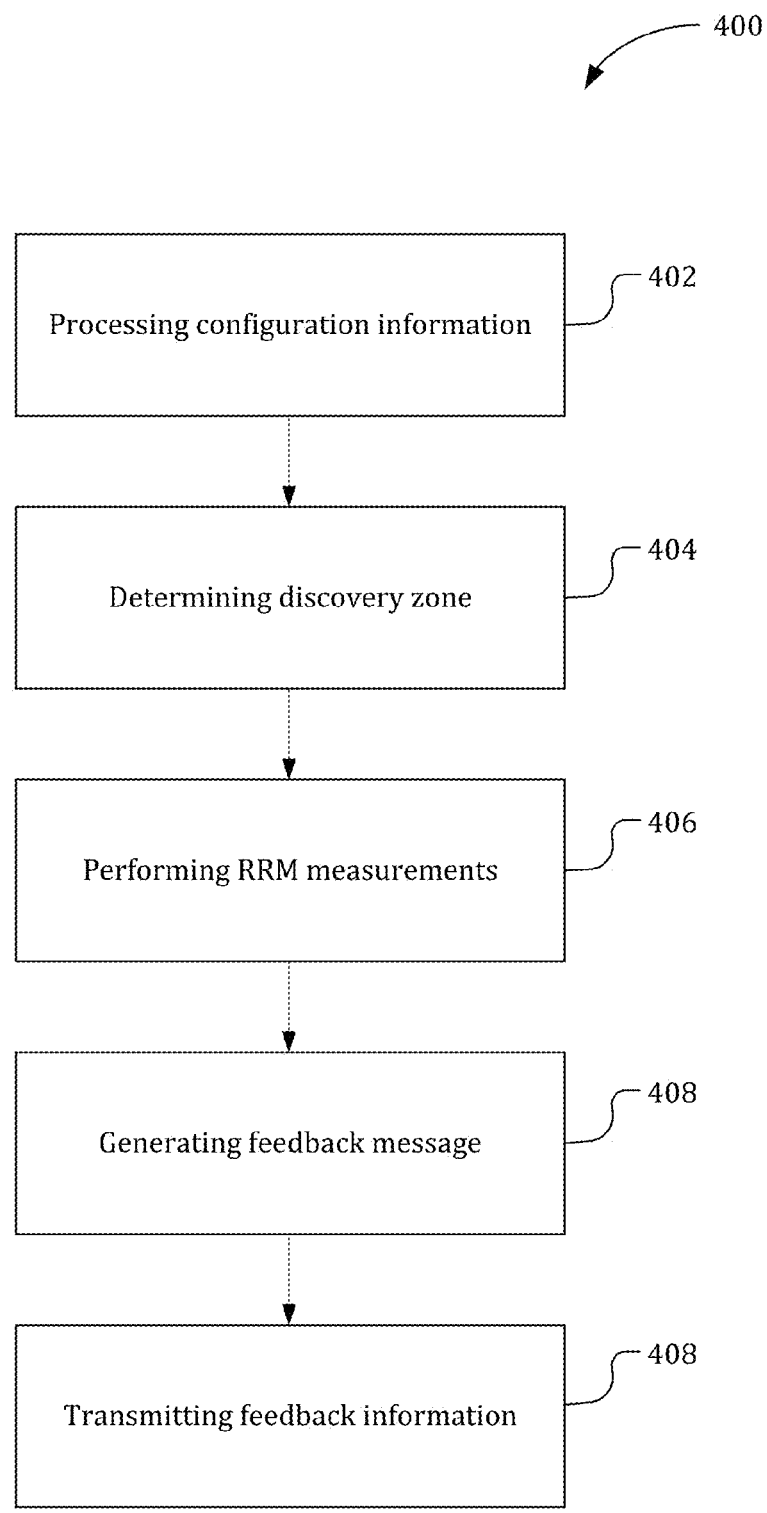
FIG. 4 schematically illustrates a process by which a user equipment may measure quality of a cell discovery signal in accordance with some embodiments.

FIG. 4 shows a process 400 by which a UE may measure a quality of a cell discovery signal in accordance with some embodiments of the present disclosure. The process 400 may be performed by a UE such as UE 150. In some embodiments, the UE 150 may have one or more non-transitory, computer-readable media having instructions that, when executed, cause the UE 150 to perform some or all of the process 400. In some embodiments, the instructions may adapt the communication circuitry 155, measurement circuitry 160, reporting circuitry 165, or configuration circuitry 170 to perform some or all of the process 400.

The process 400 may include, at 402, processing configuration information by, for example, configuration circuitry 170. The configuration information may be received by the communication circuitry 155 and conveyed to the configuration circuitry 170. In some embodiments, the configuration information may be received in higher-layer signaling such as, but not limited to, RRC signaling. For example, the configuration information may be transmitted in a measDS-Config IE of an RRC configuration message such as that described above. The configuration circuitry 170 may use the configuration information to configure the UE 150 to measure discovery signals transmitted in the network 100.

The process 400 may further include, at 404, determining a discovery zone by, for example, the configuration circuitry 170 or measurement circuitry 160. The determination of the discovery zone may be based on the configuration information. In particular, the UE 150 may determine the discovery zone by using the DMTC periodicity and offset and the duration of the discovery zone from the configuration information. The UE 150 may already know that the SSS may be located in the first subframe within the discovery zone; and may further know that, for frequency division duplexing, the PSS will be located in the first subframe within the discovery zone and, for time division duplexing, the PSS will be located in the second subframe of the discovery zone. The UE 150 may attempt to find the PSS/SSS, based on cell search operation procedures, and use the information from the PSS/SSS, in conjunction with the DMTC periodicity and offset and the duration of the discovery zone, to determine an exact location of the discovery zone.

The process 400 may further include, at 406, performing the RRM measurements by, for example, the measurement circuitry 160. As discussed above, in some embodiments the measurement circuitry 160 may perform DS-RSRP and DS-RSSI measurements based on the determined discovery zone.

The process 400 may further include, at 408, generating a feedback message by, for example, the reporting circuitry 165. In some embodiments, the feedback message may be generated with a DS-RSRQ that is determined based on the measured DS-RSRP and DS-RSSI.

Process 400 may further include, at 410, transmitting the generated feedback message by, for example, the communication circuitry 155.

Figure 5:
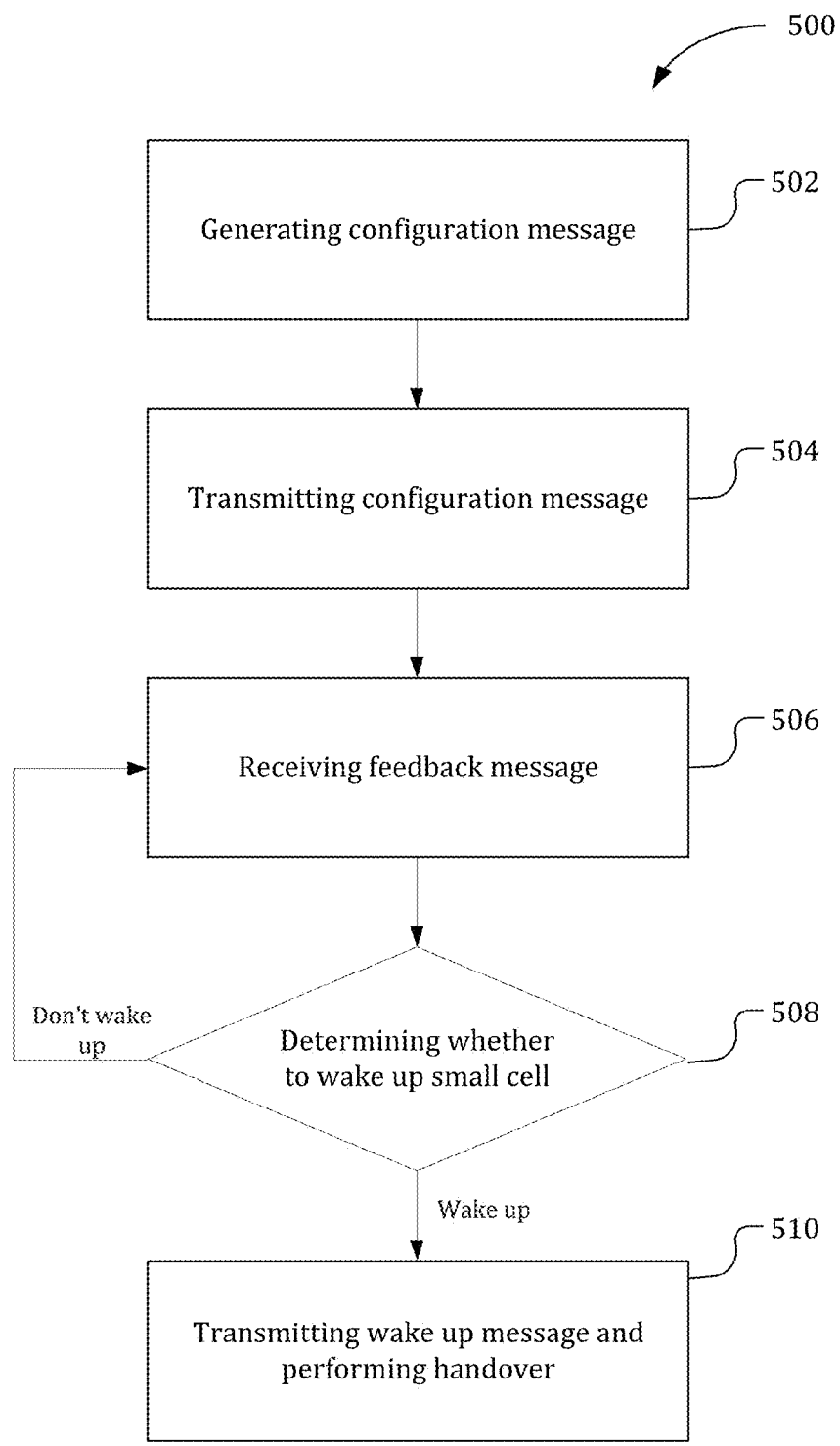
FIG. 5 schematically illustrates a process by which an eNB may manage small cell discovery inactivation in accordance with some embodiments.

FIG. 5 shows a process 500 by which an eNB may manage small cell discovery and activation in accordance with some embodiments of the present disclosure. The process 500 may be performed by an eNB such as eNB 105. In some embodiments, the eNB 105 may have one or more non-transitory, computer-readable media having instructions that, when executed, cause the eNB 105 to perform some or all of the process 500. In some embodiments, the instructions may adapt the control circuitry 106 and communication circuitry 107 to perform some or all of the process 500.

The process 500 may include, at 502, generating configuration message by, for example, the control circuitry 106. In some embodiments, the generation of the configuration message may include generating a higher-layer signaling message, such as an RRC configuration message, that includes configuration information in a measDS-Config IE as described above.

The process 500 may further include, at 504, transmitting the configuration message by, for example, the communication circuitry 107. In some embodiments, the configuration message may be generated and transmitted when a UE initially connects with the eNB 105. Configuration information may additionally or alternatively be sent in one or more update messages, for example, RRC reconfiguration messages.

Process 500 may further include, at 506, receiving a feedback message by, for example, the communication circuitry 107. The communication circuitry 107 may convey the information from the feedback message to the control circuitry 106. The information from the feedback message may include DS-RSRQ corresponding to a discovery signal of a cell of the network 100 as described above.

At 508, the process 500 may include the control circuitry 106 determining whether to wake up the small cell whose DS-RSRQ was conveyed in the feedback message. The control circuitry 106 may compare the signal metrics received in the feedback message to various thresholds to determine whether the small cell is capable of providing sufficient coverage for the UE 150. If it is determined that the small cell is capable of providing sufficient coverage, the control circuitry 106 may determine, at 508, to fully wake-up the small cell. The process 500 may then advance to 510 with the communication circuitry 107 transmitting a wake-up message to the access node of the small cell. The control circuitry 106 and communication circuitry 107 may then perform a partial or full handover process. As discussed above, the handover process may include the eNB 105 handing over at least partial service for the UE 150 to the access node. In some embodiments, the access node may be woken up as part of a carrier aggregation (CA) activation or dual-connectivity procedure.

If, at 508, the control circuitry 106 determined that the small cell is not capable of providing sufficient coverage for the UE 150, the control circuitry 106 may determine not to fully wake up the small cell. In that case, the process 500 may loop back to 506 where the eNB 105 awaits receipt of the next feedback message.

Figure 6:
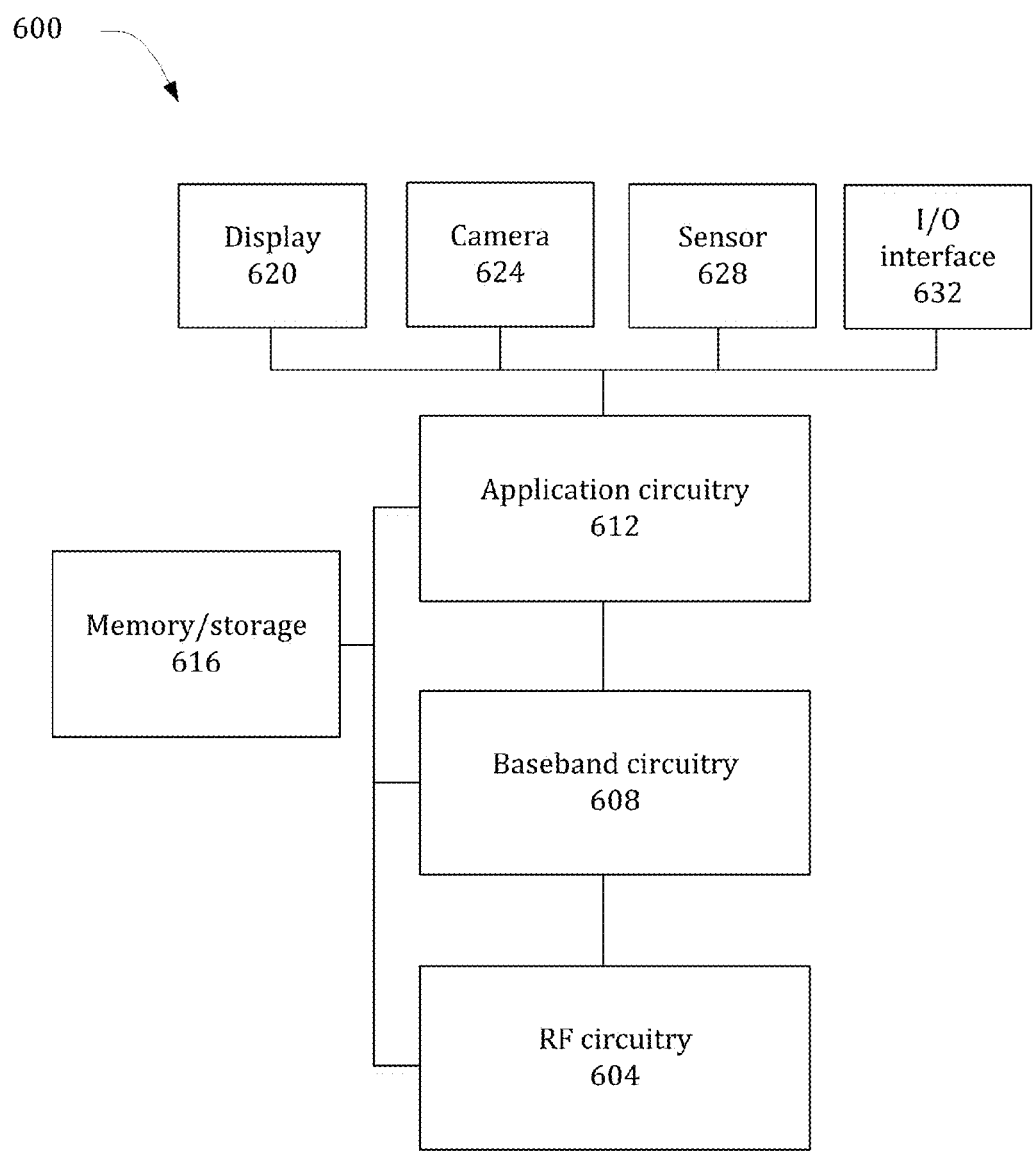
FIG. 6 schematically illustrates a system in accordance with some embodiments.

Embodiments described herein may be implemented into a system using any suitably configured hardware or software. FIG. 6 illustrates, for one embodiment, an example system comprising radio frequency (RF) circuitry 604, baseband circuitry 608, application circuitry 612, memory/storage 616, display 620, camera 624, sensor 628, and input/output (I/O) interface 632, coupled with each other at least as shown.

The application circuitry 612 may include circuitry such as, but not limited to, one or more single-core or multi-core processors. The processor(s) may include any combination of general-purpose processors and dedicated processors (e.g., graphics processors, application processors, etc.). The processors may be coupled with memory/storage 616 and configured to execute instructions stored in the memory/storage to enable various applications or operating systems running on the system.

The baseband circuitry 608 may include circuitry such as, but not limited to, one or more single-core or multi-core processors. The processor(s) may include a baseband processor. The baseband circuitry may handle various radio control functions that enables communication with one or more radio networks via the RF circuitry 604. The radio control functions may include, but are not limited to, signal modulation, encoding, decoding, radio frequency shifting, etc. In some embodiments, the baseband circuitry 608 may provide for communication compatible with one or more radio technologies. For example, in some embodiments, the baseband circuitry may support communication with EUTRAN or other wireless metropolitan area networks (WMAN), a wireless local area network (WLAN), a wireless personal area network (WPAN). Embodiments in which the baseband circuitry 608 is configured to support radio communications of more than one wireless protocol may be referred to as multi-mode baseband circuitry.

In various embodiments, baseband circuitry 608 may include circuitry to operate with signals that are not strictly considered as being in a baseband frequency. For example, in some embodiments, baseband circuitry may include circuitry to operate with signals having an intermediate frequency, which is between a baseband frequency and a radio frequency.

RF circuitry 604 may enable communication with wireless networks using modulated electromagnetic radiation through a non-solid medium. In various embodiments, the RF circuitry 604 may include switches, filters, amplifiers, etc. to facilitate the communication with the wireless network.

In various embodiments, RF circuitry 604 may include circuitry to operate with signals that are not strictly considered as being in a radio frequency. For example, in some embodiments, RF circuitry 604 may include circuitry to operate with signals having an intermediate frequency, which is between a baseband frequency and a radio frequency.

In some embodiments, some or all of the constituent components of the baseband circuitry, the application circuitry, or the memory/storage may be implemented together on a system on a chip (SOC).

In embodiments in which the system 600 is a UE, for example, UE 150, communication circuitry 155 may generally be embodied in the RF circuitry 604 but may additionally or alternatively be embodied in the baseband circuitry 608; and the measurement 112, reporting circuitry 165, and configuration circuitry 170 may generally be embodied in the baseband circuitry 608 but may additionally or alternatively be embodied in the RF circuitry 604 or application circuitry 612.

In embodiments in which the system 600 is an eNB, for example, eNB 105, communication circuitry 155 may generally be embodied in the RF circuitry 604 but may additionally or alternatively be embodied in the baseband circuitry 608; and the control circuitry 106 may generally be embodied in the baseband circuitry 608 but may additionally or alternatively be embodied in the RF circuitry 604 or application circuitry 612.

Memory/storage 616 may be used to load and store data or instructions, for example, for system. Memory/storage 616 for one embodiment may include any combination of suitable volatile memory (e.g., dynamic random access memory (DRAM)) or non-volatile memory (e.g., Flash memory). it may be understood that the memory/storage 616 may, in some embodiments, be distributed throughout the components of the system 600. For example, in some embodiments each of the RF circuitry 604, baseband circuitry 608, and application circuitry 612 may have dedicated memory/storage.

In various embodiments, the I/O interface 632 may include one or more user interfaces designed to enable user interaction with the system or peripheral component interfaces designed to enable peripheral component interaction with the system. User interfaces may include, but are not limited to a physical keyboard or keypad, a touchpad, a speaker, a microphone, etc. Peripheral component interfaces may include, but are not limited to, a non-volatile memory port, a universal serial bus (USB) port, an audio jack, and a power supply interface.

In various embodiments sensor 628 may include one or more sensing devices to determine environmental conditions or location information related to the system. In some embodiments, the sensing devices may include, but are not limited to, a gyro sensor, an accelerometer, a proximity sensor, an ambient light sensor, and a positioning unit. The positioning unit may also be part of, or interact with, the baseband circuitry or RF circuitry to communicate with components of a positioning network, e.g., a global positioning system (GPS) satellite.

In various embodiments, the display may include a display (e.g., a liquid crystal display, a touch screen display, etc.).

In various embodiments, the system 600 may be a mobile computing device such as, but not limited to, a laptop computing device, a tablet computing device, a netbook, an ultrabook, a smartphone, etc.; or an access node, for example, an eNB. In various embodiments, system may have more or less components, or different architectures.

The description herein of illustrated implementations, including what is described in the Abstract, is not intended to be exhaustive or to limit the present disclosure to the precise forms disclosed. While specific implementations and examples are described herein for illustrative purposes, various equivalent modifications are possible within the scope of the disclosure, as those skilled in the relevant art will recognize. These modifications may be made to the disclosure in light of the above detailed description.

Although certain embodiments have been illustrated and described herein for purposes of description, a wide variety of alternate or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

Various embodiments may include one or more articles of manufacture (e.g., non-transitory, computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

EXAMPLES

Some non-limiting examples are provided below.

Example 1 includes one or more non-transitory, computer-readable media having instructions that, when executed, cause a user equipment to: process configuration information, received from an enhanced node B (eNB), that includes information about a duration of a discovery zone in which a discovery signal of a cell of a network may be transmitted, wherein the discovery zone comprises one or more time units; and measure received power over all orthogonal frequency division multiplexing (OFDM) symbols within the discovery zone to determine a received signal strength indicator (RSSI).

Example 2 includes the one or more non-transitory, computer-readable media of example 1, wherein the configuration information further includes an indication of a discovery signal measurement timing configuration (DMTC).

Example 3 includes the one or more non-transitory, computer-readable media of example 2, wherein the DMTC comprises a periodicity and offset.

Example 4 includes the one or more non-transitory, computer-readable media of any of examples 1-3, wherein the one or more time units comprise one or more subframes.

Example 5 includes the one or more non-transitory, computer-readable media of any of examples 1-4, wherein all OFDM symbols comprise all OFDM symbols of downlink parts of one or more subframes in the discovery zone.

Example 6 includes the one or more non-transitory, computer-readable media of any of examples 1-4, wherein the instructions, when executed, further cause the user equipment to: generate a reference signal received quality (RSRQ) based on the RSSI.

Example 7 includes the one or more non-transitory, computer-readable media of example 6, wherein the instructions, when executed, further cause the user equipment to determine a reference signal received power (RSRP) based on a linear average of power contributions of resource elements that carry cell-specific reference signals within the discovery zone.

Example 8 includes the one or more non-transitory, computer-readable media of example 7, wherein the instructions, when executed, further cause the user equipment to: generate the RSRQ to be equal to (N×RSRP)/RSSI, where N is a number of resource blocks of the discovery zone.

Example 9 includes the one or more non-transitory, computer-readable media of example 8, wherein the instructions, when executed, further cause the user equipment to transmit a feedback message, which includes an indication of the RSRQ, to the eNB.

Example 10 includes a user equipment comprising: communication circuitry to receive configuration information from an evolved node B (eNB), wherein the configuration information includes an indication of a duration of a discovery zone in which discovery signals from access nodes may be transmitted based on the configuration information; configuration circuitry, coupled with the communication circuitry, to determine the discovery zone based on the configuration information; and measurement circuitry, coupled with the configuration circuitry, to perform a radio resource management (RRM) measurements based on the determined discovery zone.

Example 11 includes the user equipment of example 10, further comprising: reporting circuitry, coupled with the measurement circuitry, to generate a feedback message based on the RRM measurements.

Example 12 includes the user equipment of example 11, wherein the measurement circuitry is further to determine a received signal strength indicator (RSSI) based on the RRM measurements; and the reporting circuitry is to generate the feedback message based on the RSSI.

Example 13 includes the user equipment of example 12, wherein the measurement circuitry is to measure received signal strength over all orthogonal frequency division multiplexing (OFDM) symbols within the discovery zone to determine the RSSI.

Example 14 includes the user equipment of example 12, wherein the measurement circuitry is to measure all potential resource elements, within the discovery zone, that can be transmitted with the discovery signals to determine the RSSI.

Example 15 includes the user equipment of any of examples 10-14, wherein the discovery zone comprises one or more subframes.

Example 16 includes the user equipment of any of examples 10-14, wherein the communication circuitry is to receive a configuration information in a radio resource control (RRC) configuration message.

Example 17 includes the user equipment of any of examples 10-14, wherein the configuration information further includes an indication of a discovery signal measurement timing configuration (DMTC that comprises a periodicity and offset and the configuration circuitry is to determine the discovery zone based further on the periodicity, offset, duration, and a received primary or secondary synchronization signal.

Example 18 includes one or more non-transitory, computer-readable media having instructions that, when executed, cause an evolved node B (eNB) to: generate configuration information that includes an indication of a duration of a discovery zone; transmit the configuration information to a user equipment; receive a feedback message from the user equipment that includes an indication of a reference signal received quality (RSRQ) that corresponds to a discovery signal of an access node; and determine whether to wake the access node to provide a service cell for the user equipment based on the RSRQ.

Example 19 includes the one or more non-transitory, computer-readable media of example 18, wherein the configuration information further includes an indication of a discovery signal measurement timing configuration (DMTC) that comprises a periodicity and an offset.

Example 20 includes the one or more non-transitory, computer-readable media of any of examples 18-19, wherein the instructions, when executed, further cause the eNB to determine to wake up the access node and send a wake-up message to the access node and perform a handover process to handover at least partial service for the user equipment to the access node.

Example 21 includes a user equipment comprising: means for processing configuration information from an evolved node B (eNB), wherein the configuration information includes an indication of a duration of a discovery zone in which discovery signals from access nodes may be transmitted based on the configuration information; means for determining the discovery zone based on the configuration information; and means for performing a radio resource management (RRM) measurements based on the determined discovery zone.

Example 22 includes the user equipment of example 21, further comprising: means for generating a feedback message based on the RRM measurements.

Example 23 includes the user equipment of example 22, further comprising: means for determining a received signal strength indicator (RSSI) based on the RRM measurements; and said means for generating the feedback message to generate the feedback message based on the RSSI.

Example 24 includes the user equipment of example 23, wherein the means for determining the RSSI are to measure received signal strength over all orthogonal frequency division multiplexing (OFDM) symbols within the discovery zone to determine the RSSI.

Example 25 includes the user equipment of example 23, wherein the means for determining the RSSI are to measure all potential resource elements, within the discovery zone, that can be transmitted with the discovery signals to determine the RSSI.

Example 26 includes the user equipment of any of examples 21-25, wherein the discovery zone comprises one or more subframes.

Example 27 includes the user equipment of any of examples 21-26, wherein the configuration information further includes an indication of a discovery signal measurement timing configuration (DMTC) that comprises a periodicity and offset and the means for determining the discovery zone are to determine the discovery zone based further on the periodicity, offset, duration, and a received primary or secondary synchronization signal.

Example 28 includes a method of operating an evolved node B (eNB) comprising: generating configuration information that includes an indication of a duration of a discovery zone; transmitting the configuration information to a user equipment; receiving a feedback message from the user equipment that includes an indication of a reference signal received quality (RSRQ) that corresponds to a discovery signal of an access node; and determining whether to wake the access node to provide a service cell for the user equipment based on the RSRQ.

Example 29 includes the method of example 28, wherein the configuration information further includes an indication of a discovery signal measurement timing configuration (DMTC) that comprises a periodicity and an offset.

Example 30 includes the method of any of examples 28-29, wherein the instructions, when executed, further cause the eNB to determine to wake up the access node and send a wake-up message to the access node and perform a handover process to handover at least partial service for the user equipment to the access node.

Example 31 includes an apparatus configured to perform the method of any of examples 28-30.

Example 32 includes a user equipment comprising: means for processing configuration information, received from an enhanced node B (eNB), that includes information about a duration of a discovery zone in which a discovery signal of a cell of a network may be transmitted, wherein the discovery zone comprises one or more time units; and means for measuring received power over all orthogonal frequency division multiplexing (OFDM) symbols within the discovery zone to determine a received signal strength indicator (RSSI).

Example 33 includes the UE of example 32, wherein the configuration information further includes an indication of a discovery signal measurement timing configuration (DMTC).

Example 34 includes the UE of example 33, wherein the DMTC comprises a periodicity and offset.

Example 35 includes the UE of any of examples 32-34, wherein the one or more time units comprise one or more subframes.

Example 36 includes the UE of any of examples 32-35, wherein all OFDM symbols comprise all OFDM symbols of downlink parts of one or more subframes in the discovery zone.

Example 37 includes the UE of any of examples 32-35, further comprising:
means for generating a reference signal received quality (RSRQ) based on the RSSI.

Example 38 includes the UE of example 37, further comprising: means for determining a reference signal received power (RSRP) based on a linear average of power contributions of resource elements that carry cell-specific reference signals within the discovery zone.

Example 39 includes the UE of example 38, wherein said means for generating the RSRQ are to set RSRQ to be equal to (N×RSRP)/RSSI, where N is a number of resource blocks of the discovery zone.

Example 40 includes the UE of example 39, further comprising: means for transmitting a feedback message, which includes an indication of the RSRQ, to the eNB.

What is claimed is:

1. One or more non-transitory, computer-readable media having instructions that, when executed, cause a user equipment to:
process configuration information, received from an Evolved Universal Terrestrial Radio Access Network (EUTRAN), that includes information about a duration of a discovery zone in which a discovery signal of a cell of the EUTRAN may be transmitted;
measure received power over all orthogonal frequency division multiplexing (OFDM) symbols that could carry a discovery signal within the discovery zone to determine a received signal strength indicator (RSSI);
determine a reference signal received power (RSRP) based on a linear average of power contributions of resource elements that carry cell-specific reference signals within the discovery zone: and
generate a reference signal received quality (RSRQ) based on the RSSI and the RSRP.

2. The one or more non-transitory, computer-readable media of claim 1, wherein the configuration information further includes an indication of a discovery signal measurement timing configuration (DMTC).

3. The one or more non-transitory, computer-readable media of claim 2, wherein the DMTC comprises a periodicity and offset.

4. The one or more non-transitory, computer-readable media of claim 1, wherein the discovery zone comprises one or more subframes.

5. The one or more non-transitory, computer-readable media of claim 1, wherein all OFDM symbols comprise all OFDM symbols of downlink parts of one or more subframes in the discovery zone.

6. The one or more non-transitory, computer-readable media of claim 1, wherein the instructions, when executed, further cause the user equipment to generate the RSRQ to be equal to (N×RSRP)/RSSI, where N is a number of resource blocks of the discovery zone.

7. The one or more non-transitory, computer-readable media of claim 6, wherein the instructions, when executed, further cause the user equipment to transmit a feedback message, which includes an indication of the RSRQ, to the EUTRAN.

8. An apparatus to be employed in a user equipment, the apparatus comprising:
configuration circuitry to process configuration information, received from an Evolved Universal Terrestrial Radio Access Network (EUTRAN), that includes information about a duration of a discovery zone in which a discovery signal of a cell of the EUTRAN may be transmitted;
measurement circuitry to measure received power over all orthogonal frequency division multiplexing (OFDM) symbols that could carry a discovery signal within a discovery zone to determine a received signal strength indicator (RSSI); and
reporting circuitry to generate a feedback message that includes a reference signal received quality (RSRQ) based on the RSSI and a reference signal received power (RSRP), the RSRP determined based on a linear average of power contributions of resource elements that carry cell-specific reference signals within the discovery zone.

9. The apparatus of claim 8, wherein the configuration information further includes an indication of a discovery signal measurement timing configuration (DMTC).

10. The apparatus of claim 9, wherein the DMTC comprises a periodicity and offset.

11. The apparatus of claim 8, wherein the discovery zone comprises one or more subframes.

12. The apparatus of claim 8, wherein all OFDM symbols comprise all OFDM symbols of downlink parts of one or more subframes in the discovery zone.

13. The apparatus of claim 8, wherein the RSRQ is equal to (N×RSRP)/RSSI, where N is a number of resource blocks of the discovery zone.

14. The apparatus of claim 13, wherein the apparatus further comprises:
communication circuitry to transmit a feedback message, which includes an indication of the RSRQ to the EUTRAN.

* * * * *